United States Patent [19]

Hare et al.

[11] Patent Number: 4,941,585

[45] Date of Patent: Jul. 17, 1990

[54] BAKING PAN

[75] Inventors: Wilbert K. Hare, Lemont; Morris Kaufman, Morton Grove; William M. Moroziuk, River Grove, all of Ill.

[73] Assignee: Ekco/Glaco Inc., Humbolt, Tenn.

[21] Appl. No.: 192,907

[22] Filed: May 12, 1988

[51] Int. Cl.⁵ ............................................. A47J 43/18
[52] U.S. Cl. ...................................... 220/23.2; 220/21; 220/23.8; 99/374; 99/432
[58] Field of Search .................. 99/432, 439, 428, 374; 220/21, 23.2, 76, 23.8, 23.83

[56] References Cited

U.S. PATENT DOCUMENTS

| | | | |
|---|---|---|---|
| 1,831,147 | 3/1930 | Smith | 99/439 |
| 3,296,956 | 5/1964 | Turner | 99/439 |
| 3,590,728 | 5/1969 | Stanley | 99/439 |

Primary Examiner—Stephen Marcus
Assistant Examiner—Gilbert W. Reece
Attorney, Agent, or Firm—Robert D. Teichert

[57] ABSTRACT

A baking pan having a multiplicity of baking units constructed by forming the baking units as individual pieces, disposing the pre-formed baking units within openings formed in a sheet material and securing the baking units to the sheet material. The means for securing the baking units to the sheet material comprises interlocking portions of the baking units with the sheet material to form an assembly of baking units.

6 Claims, 3 Drawing Sheets

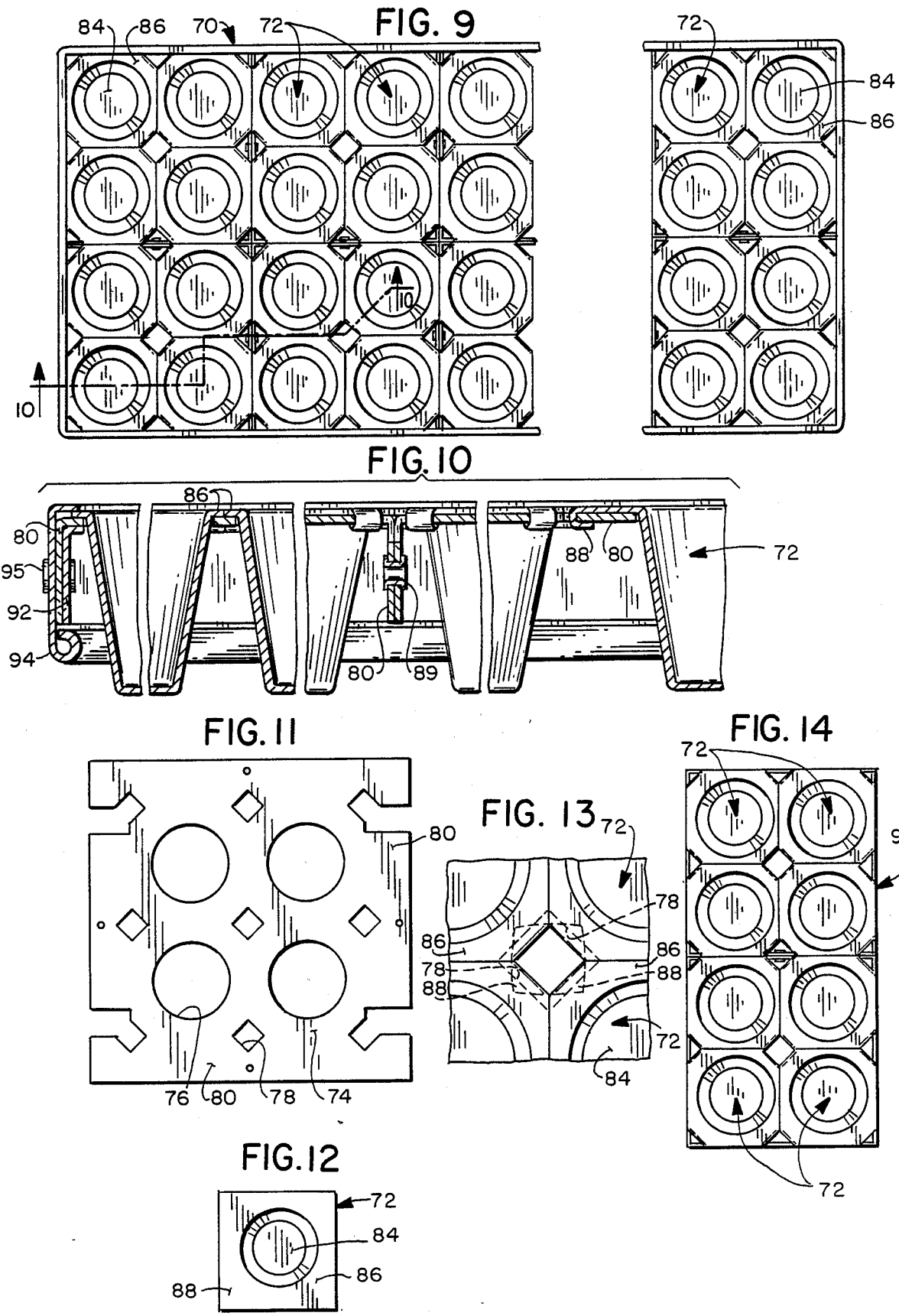

4,941,585

BAKING PAN

BACKGROUND OF THE INVENTION

In the commercial baking of a multiplicity of baked products in a single baking pan, it is of great importance to achieve the greatest number of baked product units per square foot of space in the oven, proof box, cooler, and other types of production equipment. In this regard, and with consideration of the limitations of existing commercial baking production equipment to acommodate baking pans of a specific size and shape, it is important to maximize the number of baked product units within such limitations.

In addition, it is necessary that such baking pans be formed to provide sufficient mechanical strength and stability to withstand abuses in the handling of the baking pans with automatic production equipment.

In the production of baking pans, tin-plated steel or aluminized steel are the materials normally used which provide the necessary characteristics for use in commercial baking operations. The manipulation or fabrication of such metal materials to form baking pans with multiple baking units is usually accomplished by one or two well-known methods. One method, known as "drawing", involves forming the pan from a single sheet of material whereby, through a series of machining steps, the sheet material is deformed or "drawn" to shape and define the required baking units at predetermined locations on the sheet. The other method, utilizing fabricating techniques, involves forming the baking units as separate pieces which are disposed within matching cut-out portions of a sheet material and joined to the sheet material to provide a unitary structure.

Both of the above identified methods are well known in the baking pan industry and have recognized advantages and disadvantages when compared one-to-the-other. Basically, the "drawn" baking pan offers time and material savings in its production as well as good santitation aspects in the finished pan which makes it a preferred construction. However, the stresses and strains imposed on the sheet material during formation normally limits the drawn construction to baking units having relatively shallow depth such as buns, rolls and small cakes. Baking pans with multiple baking units of relatively deep configuration usually demand the structural integrity that is available only through construction involving fabricating techniques.

The best known and established fabricating techniques for joining pre-formed individual bakings units to a sheet materials are seaming, welding and the use of grommets. Seaming and welding, while still acceptable fabricating techniques for producing a structurally sound baking pan, have been generally replaced by the more efficient and economical construction afforded through the use of grommets to join the individual baking units to a sheet material.

SUMMARY OF THE INVENTION

This invention contemplates the provision of a baking pan having a multiplicity of baking units constructed by forming the baking units as separate pieces, disposing said baking units within cut-out portions of a sheet material and joining the baking units to the sheet material to provide a unitary structure. The means for joining the baking units to the sheet material involves providing a grommet-like interconnection betweeen the baking units and the sheet material comprised of manipulating portions of one to entrap portions of the other. It is a feature of this construction that the grommet-like interconnection utilizes materials from the baking units and the sheet material per se to establish an interlocking retention.

This invention also contemplates the assembly of a group of baking units with a sheet material and thereafter the joining of a series of similar assemblies to provide a complete baking pan comprised of a pre-determined number of baking units.

DESCRIPTION OF THE DRAWINGS

FIG. 9 is a top plan view of a baking pan constructed in a modified manner to provide a pan comparable with the pan illustrated in FIG. 1.

FIG. 10 is a sectional view on an enlarged scale taken along lines 10—10 of FIG. 9.

FIG. 11 is a top plan view of a sheet material used in the construction of the baking pan of FIG. 9 formed to provide a plurality of openings therethrough.

FIG. 12 is a top view of an individual baking unit for the construction of the baking pan of FIG. 9.

FIG. 13 is an enlarged fragmentary view of the baking pan illustrated in FIG. 9.

FIG. 14 is a top plan view of an assemblage of 8 baking units of the modified structure disclosed in FIG. 9.

DESCRIPTION OF THE PREFERRED EMBODIMENT

Figure 1:
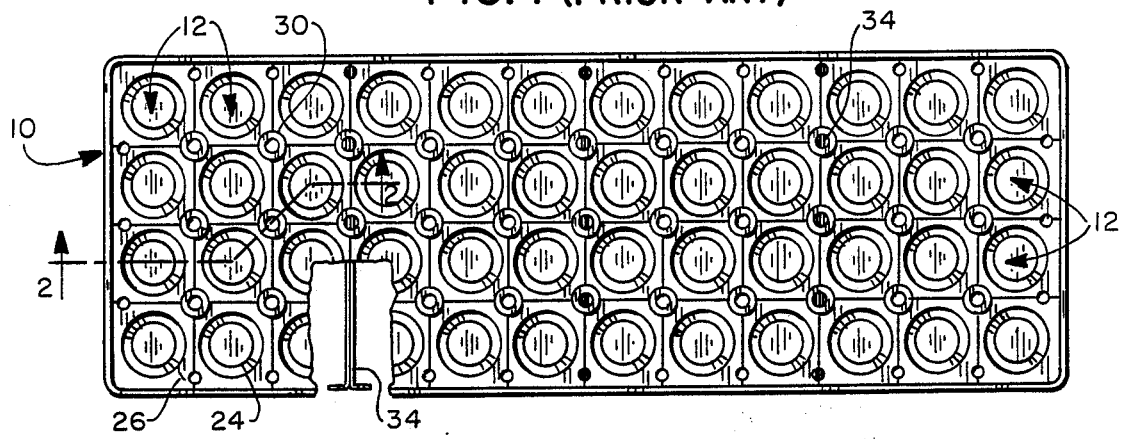
FIG. 1 is a top plan view of a prior art baking pan constructed by the established fabricating technique utilizing grommets to join individual baking units to a sheet material, with a portion broken away to disclose support ribs.

As shown in FIG. 1, and as illustrative generally of the prior art, a baking pan 10 having a predetermined overall size and dimension is constructed to provide multiple baking units 12 of a specific size and configuration. In a manner well known in the art, and as best seen by referring to FIGS. 2 and 3, the baking pan 10 is a fabricated structure comprising a flat panel or sheet material 14, such as aluminum, tin-plated or aluminized steel, pierced to provide relatively large openings 16, smaller openings 18, drain openings 19 and having a peripheral flange portion 20. Individual baking units indicated by the reference numeral 12 are formed to provide a cup portion 24 having an outwardly extending flange member 26, said flange being generally of square configuration and having notched corners 28. The cup portions 24 of the baking units 12 are disposed in the panel openings 16 and the notched corners 28 of the abutting baking unit flanges 26 overlie the panel openings 18 in which a securing grommet 30 is disposed.

Figure 2:
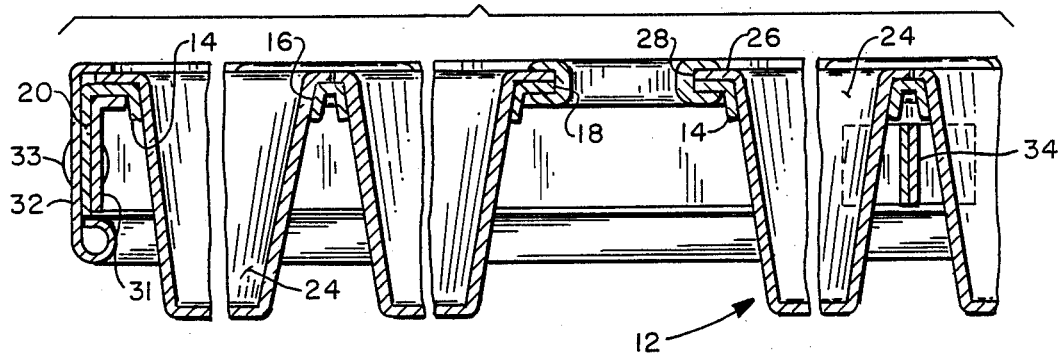
FIG. 2 is a sectional view on an enlarged scale taken along lines 2—2 of FIG. 1.

As best seen in FIG. 2, the peripheral flange portion 20 of the flat panel 14 is formed to extend downwardly and an inside angle member 31 and an outside channel member 32 are secured to the peripheral flanges 20 by means of rivets 33. Multiple cross brace members 34 are utilized to assure rigidity of the resultant structure.

Figure 3:
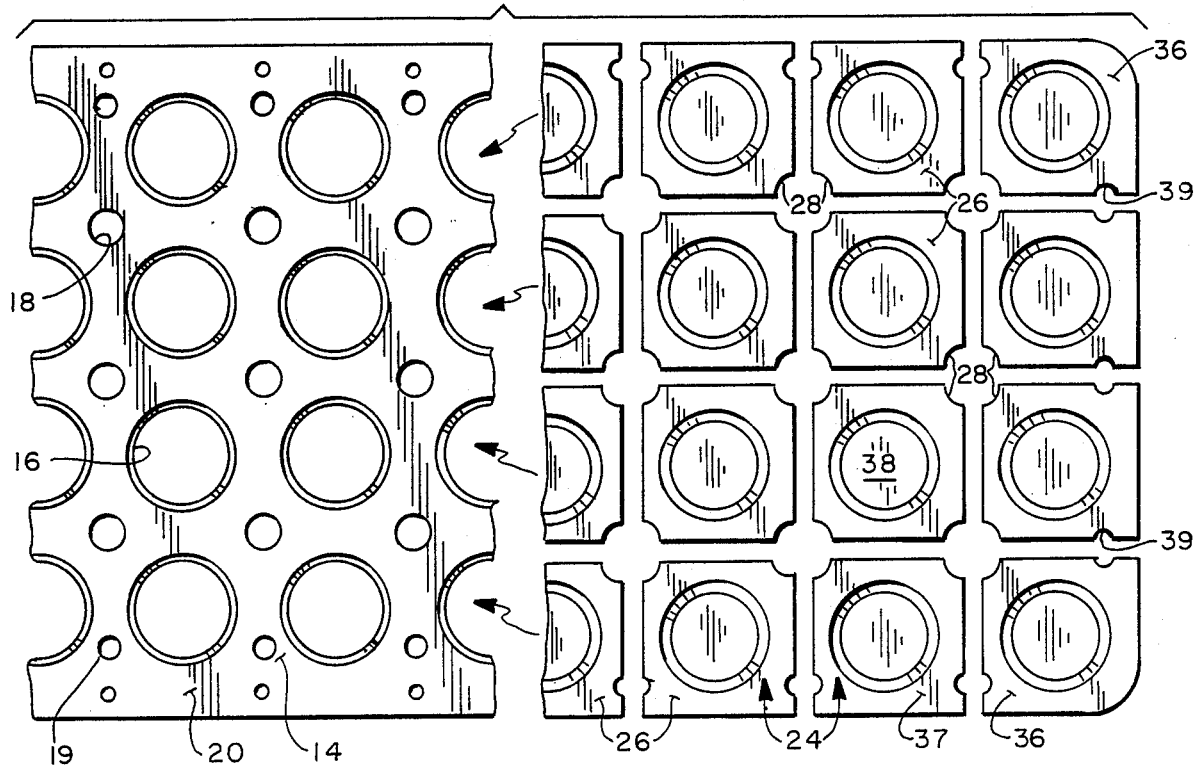
FIG. 3 is an exploded view showing a fragment of the sheet material formed to provide a plurality of openings and a group of individual baking units arranged to illustrate the relation of the individual baking units to the sheet material openings.
Figure 4:
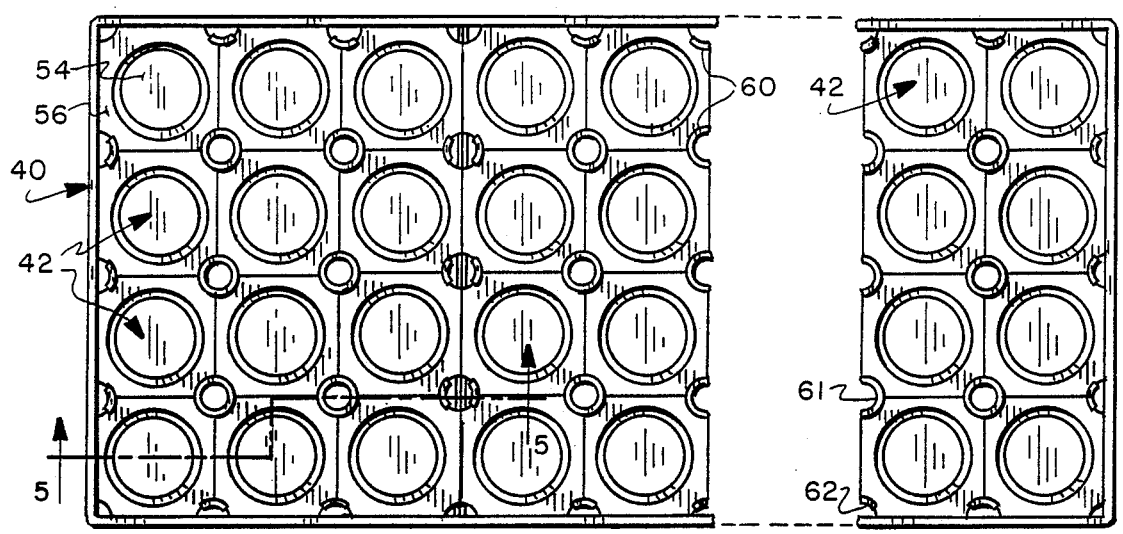
FIG. 4 is a top plan view of a baking pan constructed in accordance with may invention to provide a pan comparable with the pan illustrated in FIG. 1.

As shown in FIG. 3, this type of construction requires three different shaped baking units, to wit, corner units 36, side units 37 and interior units 38. It is noted that the interior units 38 have four notched corners 28, whereas the side units 37 have two notched corners 28 and the corner units 36 have but one notched corner 28. Also, the corner units 36 and the side units 37 have drain notches 39 formed on the flanges thereof in a manner as to be spaced inwardly of the peripheral flange edges of the assembled baking units and complementary one-to-another and overlie the panel drain openings 19.

Referring now to FIGS. 4 through 8, there is shown a baking pan 40 constructed in accordance with the teachings of my invention to provide a plurality of baking units 42. The baking pan 40 is a fabricated structure comprising a flat panel or sheet material 44, such as aluminium, tin-plated steel or aluminized steel, pierced to provide relatively large openings 46, smaller openings 48 and having a peripheral flange portion 50. Individual baking units indicated by the reference numeral 42 are formed to provide a cup portion 54 having an outwardly extending flange member 56, said flange being of square configuration and having notched corners 58. The cup portions 54 of the baking units 42 are disposed in the panel openings 46 and the notched corners 58 of the abutting baking unit flanges 56 overlie the panel openings 48.

Figure 5:
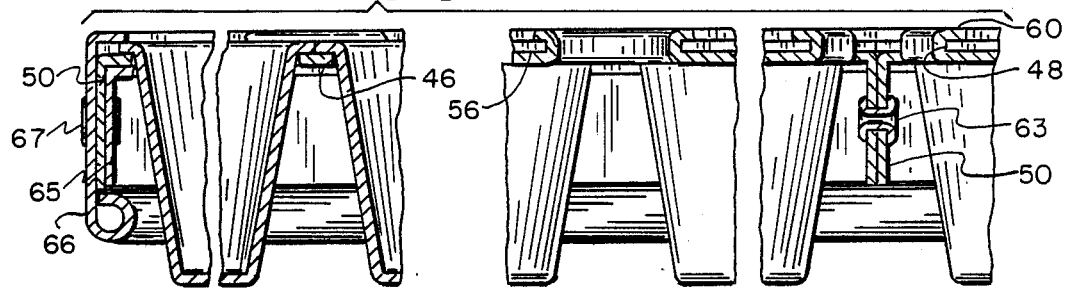
FIG. 5 is a sectional view on an enlarged scale taken along lines 5—5 of FIG. 4.
Figure 6:
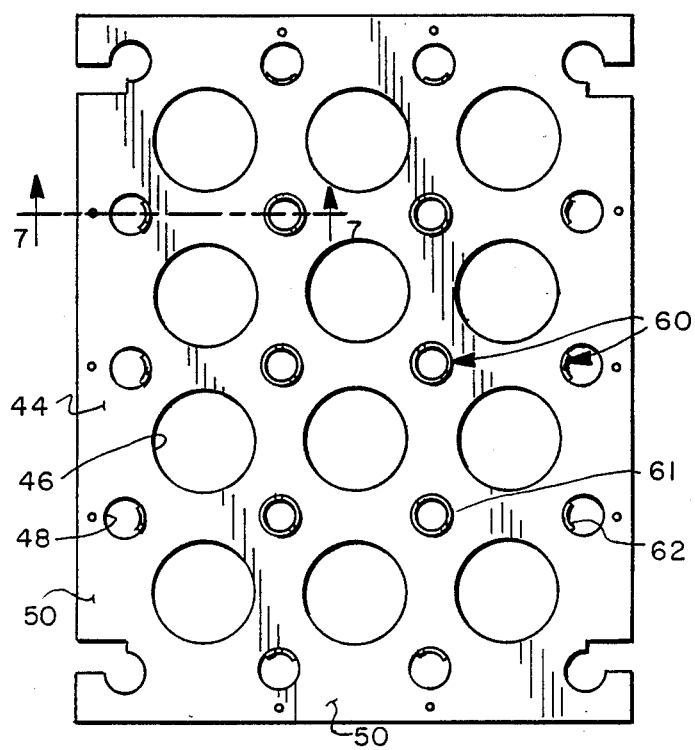
FIG. 6 is a top plan view of a sheet material used in the construction of the baking pan of FIG. 4 formed to provide a plurality of openings therethrough.
Figure 7:
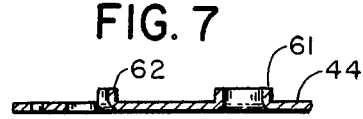
FIG. 7 is a sectional view taken along lines 7—7 of FIG. 6.
Figure 8:
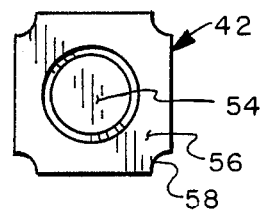
FIG. 8 is a top view of an individual baking unit for the construction of the baking pan of FIG. 4.

As best shown in FIGS. 6 and 7, the sheet material 44 is formed to provide upstanding flanges or collars 60 adjacent the openings 48, such upstanding collars being swedged down during fabrication to entrap abutting baking unit flanges 56 as illustrated in FIG. 5. It is noted that a full circular collar, indicated by reference numeral 61, is formed adjacent those openings 48 which are positioned to underlie the corner notches 58 of four abutting baking unit flanges 56, whereas a quarter circle collar, indicated by reference numeral 62, is formed adjacent those openings 48 which are positioned on the periphery of the sheet material 44 and underlie the corner notches 58 of only two abutting baking unit flanges 56.

Referring to FIG. 6, the sheet material 44 is of a predetermined size and shape so as to provide twelve large openings 46 arranged in 3 rows of four large openings in each row. When the sheet material 44 is assembled with twelve baking units 42 as above described and the peripheral flange portions 50 are bent downwardly to a plane perpendicular to the sheet material, an additional assembly of twelve baking units can be disposed in side-by-side relationship with the flange portions 50 adjacent a row of four baking units 42 being in abutment and joined together with rivets 63, see FIG. 5. The joining together of similar twelve baking unit assemblies in series permits fabrication of baking pans having baking units arranged in rows of four baking units each numbering 24, 36 or 48, or, in fact, any multiple of 12.

As best seen in FIG. 5, the peripheral flange portions 50 of the sheet material 44 that define the perimeter of the joined baking unit assemblies have an inside angle member 65 and an outside channel member 66 secured thereto by means of rivets 67.

Referring now to FIGS. 9 through 14, there is shown a modified form of a baking pan 70 constructed in accordance with the teachings of my invention to provide a plurality of baking units 72. The baking pan 70 is a fabricated structure comprising a flat panel or sheet material 74, such as aluminium, tin-plated steel or aluminized steel, pierced to provide relatively large openings 76, smaller openings 78 and having a peripheral flange portion 80. Individual baking units indicated by the reference numeral 72 are formed to provide a cup portion 84 having an outwardly extending flange member 86, said flange being of square configuration. The cup portions 84 of the baking units 72 are disposed in the panel openings 76 and the corners 88 of the abutting baking unit flanges 86 overlie the panel openings 78.

As best shown in FIGS. 10 and 13, the baking unit flange corners 88 are manipulated downwardly through the underlying panel opening 78 and then swedged outwardly to entrap the sheet material 74 between the baking unit flange 86 and the flange corner 88.

As shown in FIG. 11, the sheet 74 is of a predetermined size and shape so as to provide four large openings 76 arranged in 2 rows of two large openings in each row. When the sheet material 74 is assembled with four baking units 72 as above described and the peripheral flange portions 80 are bent downwardly to a plane perpendicular to the sheet material, an additional assembly of four baking units can be disposed in side-to-side relationship with the adjacent flange portions 80 in abutment and joined together by rivets 89, see FIG. 10. The joining together of 2 four baking unit assemblies provides an assemblage 90, see FIG. 14, comprising eight baking units arranged in 2 rows of four baking units in each row.

The joining of eight baking unit assemblages in series permits fabrication of baking pans having baking units arranged in rows of four baking units each numbering 16, 24, 32, 40, 48, or, in fact, any multiple of 8. As best seen in FIGS. 9 and 10, the peripheral flange portions 80 of the sheet material 74 that define the perimeter of the joined assemblages 90 have inside angle members 92 and an outside encircling channel member 94 secured thereto by means of rivets 95.

It should be clear from the foregoing description and with reference to the drawings that a baking pan made in accordance therewith is produced in a relatively simple manner that reduces the number of manufacturing steps as well as the number of separate components required in assembly, and reduces the amount of material heretofore required for a comparable baking pan. It should also be apparent that various changes may be made in the form, construction and arrangement of parts as set forth and described herein without departing from the spirit and scope of my invention as defined by the appended claims.

What is claimed:

1. A baking pan assembly comprising a flat panel member formed to provide a downwardly extending flange at the periphery thereof, a plurality of relatively large apertures therethrough and a plurality of relatively small apertures therethrough, said small apertures positioned equi-distant from adjacent large apertures, a plurality of baking units, each baking unit formed to provide a central cup-like portion terminating at the open end thereof in an outwardly extending rectangular-shaped flange, each said baking unit having said central cup-like portion disposed within a large aperture and said rectangular-shaped flange overlying the flat panel member to dispose each corner portion of each flange adjacent a small aperture of said flat member, each corner of the baking unit flange is notched and the panel member is formed to provide an upstanding collar adjacent each small aperture swedged to entrap the adjacent flange corners of said baking units between said collar and said panel member.

2. A baking pan assembly according to claim 1 wherein the small apertures positioned in the non-peripheral area of the panel member have collar members characterized as being circular and the small apertures positioned in the peripheral area of the panel member, excluding the small apertures located in the corner area of the panel member, have collar members characterized as being arcuate.

3. A Baking pan assembly comprising a flat panel member formed to provide a downwardly extending flange at the periphery thereof, a plurality of relatively large apertures therethrough and a plurality of relatively small apertures therethrough, said small apertures positioned equi-distant from adjacent large apertures, a plurality of baking units, each baking unit formed to provide a central cup-like portion terminating at the open end thereof in an outwardly extending rectangular-shaped flange, each said baking unit having said central cup-like portion disposed within a large aperture and said rectangular-shaped flange overlying the flat panel member to dispose each corner portion of each flange adjacent a small aperture of said flat member, the corners of the baking unit flanges are swedged downwardly through a small aperture and outwardly therefrom to entrap the panel member between the baking unit flange and said flange corner.

4. A baking pan assembly according to claim 3 wherein each small aperture of the panel member is formed as a rectangle.

5. A baking pan assembly according to claim 2 or claim 4 wherein said baking pan assembly is juxtaposed with a similar baking pan assembly and secured one to the other by means interconnecting abutting downwardly extending flanges of said panel members.

6. A baking pan assembly according to claim 2 or claim 4 wherein said baking pan assembly is juxtaposed with similar baking pan assemblies, secured one to the other by means interconnecting abutting downwardly extending flanges of said panel members, and a channel member secured to the outer peripheral downwardly extending flanges of the interconnected panel members.

* * * * *